(12) United States Patent
Cherian

(10) Patent No.: US 8,397,022 B2
(45) Date of Patent: Mar. 12, 2013

(54) SYSTEM AND METHOD FOR OPTIMIZED DATA BACKUP

(75) Inventor: Jacob Cherian, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 12/889,817

(22) Filed: Sep. 24, 2010

(65) Prior Publication Data

US 2012/0079220 A1   Mar. 29, 2012

(51) Int. Cl.
*G06F 12/16* (2006.01)

(52) U.S. Cl. ......... 711/114; 711/161; 711/162; 714/6.1; 714/6.23

(58) Field of Classification Search ................... 711/114, 711/161, 162; 714/6.1, 6.23
See application file for complete search history.

(56) References Cited

U.S. PATENT DOCUMENTS

| | | | | |
|---|---|---|---|---|
| 6,434,681 | B1 * | 8/2002 | Armangau | 711/162 |
| 7,222,168 | B2 * | 5/2007 | Kitamura et al. | 709/223 |
| 7,613,752 | B2 * | 11/2009 | Prahlad et al. | 1/1 |
| 2002/0116573 | A1 * | 8/2002 | Gold | 711/111 |
| 2005/0114615 | A1 * | 5/2005 | Ogasawara et al. | 711/162 |
| 2006/0129784 | A1 * | 6/2006 | Nakayama et al. | 711/170 |

OTHER PUBLICATIONS

Dell, Dynamic Virtual Storage, The Dell EqualLogic PS Series, Mar. 2009.

* cited by examiner

*Primary Examiner* — Jae Yu
(74) *Attorney, Agent, or Firm* — Hamilton & Terrile, LLP; Stephen A. Terrile

(57) ABSTRACT

A spilt backup agent model where a component on a host and a component on the block storage device function together logically to provide a backup agent. In certain embodiments, the mechanism provides a split backup agent model using a NDMP protocol. The NDMP protocol is an industry standard protocol that allows for backup of hosts with a single backup agent that is compatible with multiple independent software vendor (ISV) backup software. Thus with the present invention, proprietary backup software dependent host agents are not required. The NDMP protocol provides for separation of control and data connections where the control path runs between the data server on the host that needs to be backed up and backup software (e.g., a Data Management Application (DMA)) and between the backup device and the backup software. The data path runs between the host and the backup device.

12 Claims, 4 Drawing Sheets

SYSTEM AND METHOD FOR OPTIMIZED DATA BACKUP

BACKGROUND OF THE INVENTION

1. Field of the Invention

The present invention relates to information handling systems and more particularly to optimized data backup on information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue relating to information handling systems is backing up of information stored on the information handling system. Known backup operations involve reading data stored on a disk device attached to the host through an agent installed on the host. The backup agent on the host is often required to provide context about the data that is required for restore and to ensure consistency of the data being backed up. However, with the increasing adoption of external block storage devices and the processing and transformation of data in the external storage devices prior to storing the data on media (e.g. de-duplication and compression), the known mechanism used for backup often requires that the process and transformed data be returned to its original form prior to being backed up. This operation can be resource intensive (e.g., to perform the reverse transformation on the data).

FIG. 1, labeled prior art, shows an example of a known backup environment. More specifically, the backup environment includes a single network with all devices connected to it. Configurations with multiple networks are possible with different sub-sets of the components interconnected through separate networks.

FIG. 2, labeled Prior Art, shows a block diagram of the operation of the network data management protocol (NDMP). More specifically, with a NDMP backup operation, a host 210 includes a NDMP data server 212. The host 210 is coupled to a data management application (DMA) 220 as well as to a backup device 230. The backup operation is under control of the DMA 220. During the backup process, the NDMP data server 212 creates a backup stream and sends the data to the backup device 230, with control of the backup operation being provided by the DMA 220. In addition, the NDMP data server 212 also conveys backup status and information about the backup data stream that allows the retrieval of backed up information to support a restore operation.

Accordingly, it would be desirable to provide a mechanism by which external storage can participate in the backup process to avoid the transformation of data during the backup process. It would also be desirable to provide a mechanism by which a restore operation which restores the transformed data without returning the data to its original form.

SUMMARY OF THE INVENTION

In accordance with the present invention, a mechanism by which block devices can directly transfer data for back up of a file system hosted on a logical unit (LU). In certain embodiments, the mechanism uses a network data management protocol (NDMP). In other embodiments, the mechanism can use a protocol modified to allow block devices to directly transfer data for back up of a file system hosted on an LU.

More specifically, the mechanism provides a spilt backup agent model where a component on a host and a component on the block storage device function together logically to provide a backup agent. In certain embodiments, the mechanism provides a split backup agent model using a NDMP protocol. The NDMP protocol is an industry standard protocol that allows for backup of hosts with a single backup agent that is compatible with multiple independent software vendor (ISV) backup software. Thus with the present invention, proprietary backup software dependent host agents are not required. The NDMP protocol provides for separation of control and data connections where the control path runs between the data server on the host that needs to be backed up and backup software (known as a Data Management Application (DMA)) and between the backup device and the backup software. The data path runs between the host and the backup device. The format of the data sent between the host and the backup device is specified by the NDMP specification, but the content is determined by the data server thereby allowing for a split model to support backup and restore operations on transformed data without converting the data to its original form.

More specifically, in one embodiment, the invention relates to a system for performing a data server backup operation. The system includes a host; a data management application (DMA) coupled to the host; a data store array coupled to the host; and, a backup device coupled to the data store array and the data management application. Where the host, data management application, data store array and backup device perform a split backup operation, the split backup operation allowing a component on the host and a component on the storage store array function together logically to provide a backup agent.

In another embodiment, the invention relates to a method for performing a data server backup operation in a backup environment comprising a host, a data management application (DMA) coupled to the host and a data store array coupled to the host. The method includes coupling a backup device coupled to the data store array and the data management application; and performing a split backup operation, the split backup operation allowing a component on the host and a component on the storage store array function together logically to provide a backup agent.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 3:
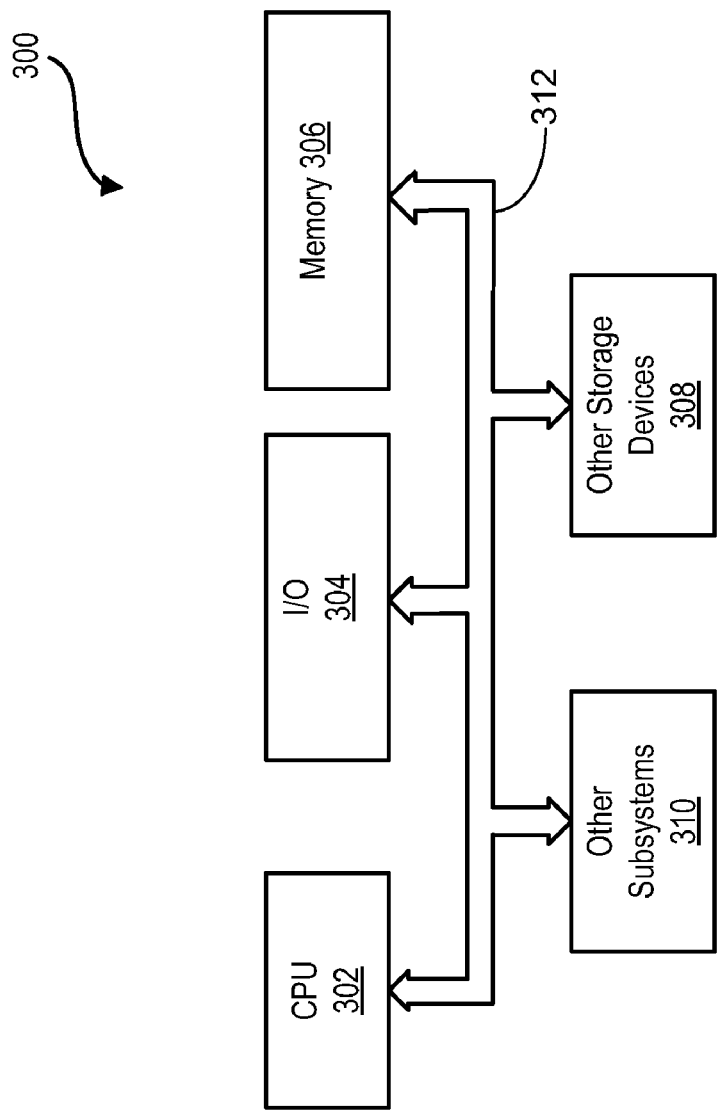
FIG. 3 shows a system block diagram of an information handling system.

Referring briefly to FIG. 3, a system block diagram of an information handling system 300 is shown. The information handling system 300 includes a processor 302, input/output (I/O) devices 304, such as a display, a keyboard, a mouse, and associated controllers (each of which may be coupled remotely to the information handling system 300), a memory 306 including volatile memory such as random access memory (RAM) and non-volatile memory such as a hard disk and drive, and other storage devices 308, such as an optical disk and drive and other memory devices, and various other subsystems 310, all interconnected via one or more buses 312.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
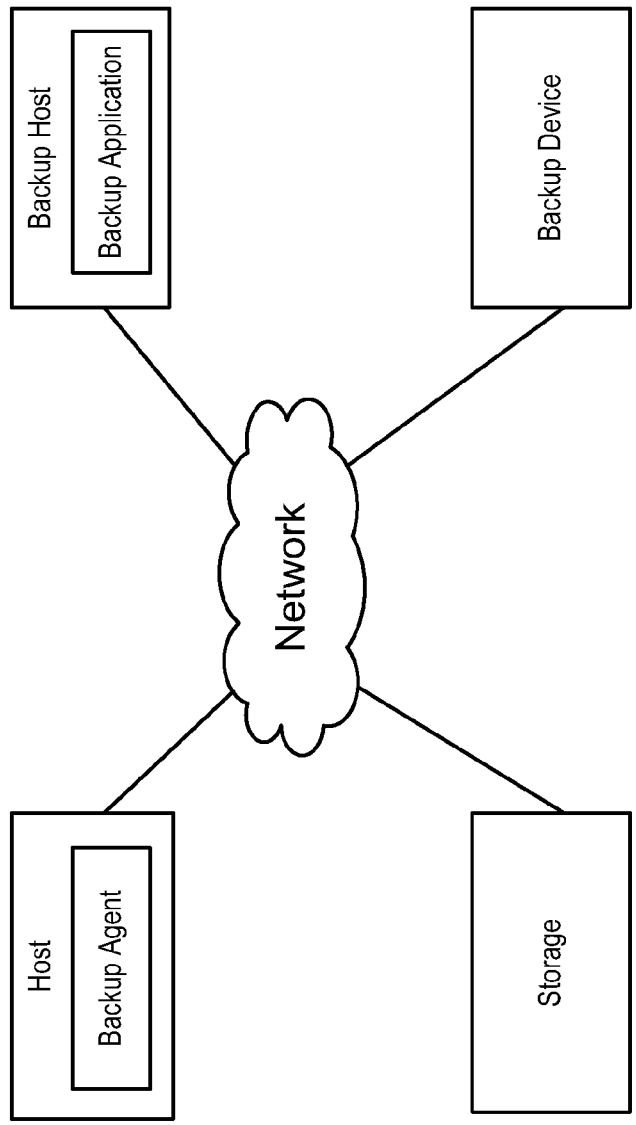
FIG. 1, labeled Prior Art, shows a block diagram of a typical backup environment.
Figure 2:
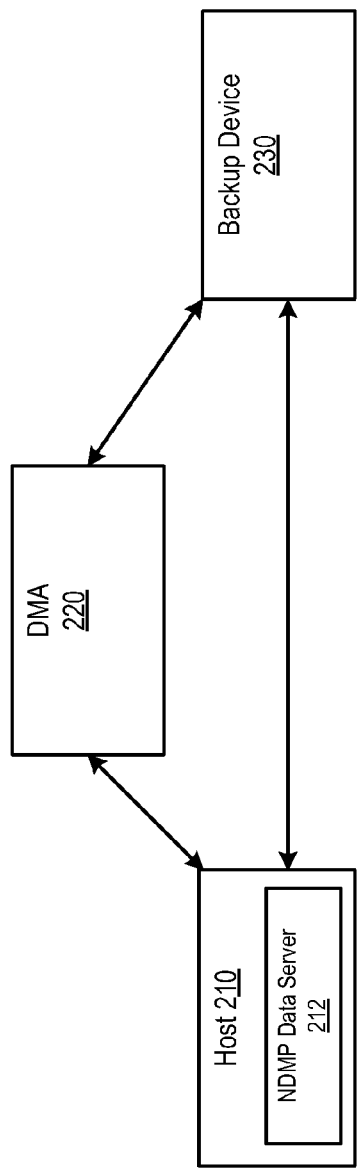
FIG. 2, labeled Prior Art, shows a block diagram of a NDMP operation.
Figure 4:
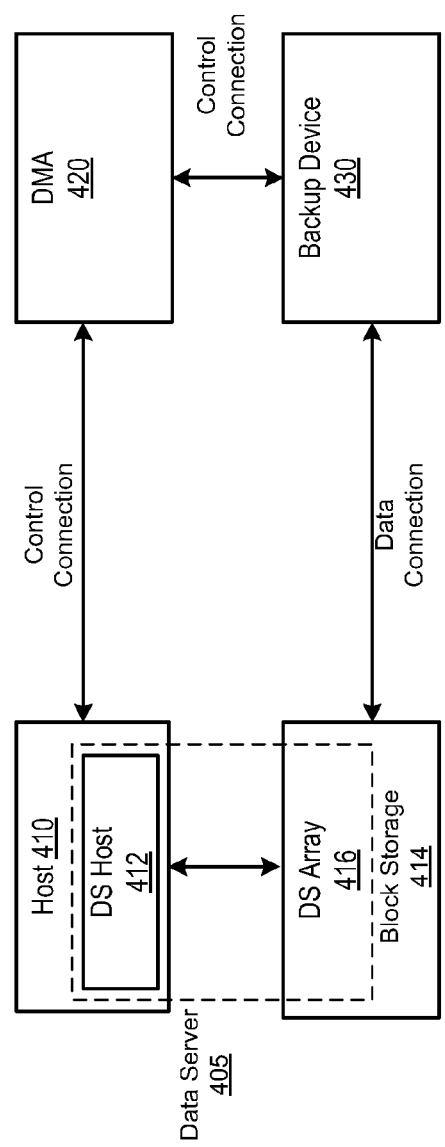
FIG. 4 shows a block diagram of a split NDMP data server backup environment.

Referring to FIG. 4, a block diagram of a split NDMP data server backup environment is shown. The split NDMP backup environment provides a spilt backup agent model where a component on a host and a component on the block storage device function together logically to provide a backup agent. In certain embodiments, the mechanism provides a split backup agent model using a NDMP protocol. The NDMP protocol is an industry standard protocol that allows for backup of hosts with a single backup agent that is compatible with multiple independent software vendor (ISV) backup software. In an NDMP environment, the backup agent is the NDMP data server and the backup device also contains an instance of an NDMP server (referred to as a tape server) and the backup software is the DMA. Thus, with the present invention, proprietary backup software dependent host agents are not required. The NDMP protocol provides for separation of control and data connections where the control path runs between the data server on the host that needs to be backed up and backup software (e.g., a data management application (DMA)) and between the backup device and the backup software. The data path runs between the host and the backup device. The format of the data sent between the host and the backup device is specified by the NDMP specification, but the content is determined by the data server.

More specifically, with a split NDMP data server backup operation, the backup architecture 400 includes a data server 405. The data server 405 includes a host 410 which includes a data server host module 412 as well as a block storage array 414 (such as the Equal Logic storage arrays available from Dell, Inc.) which includes a data server array 416.

The backup architecture 400 also includes a DMA 420 as well as a backup device 430. The backup architecture 400 includes a control connection between the host 410 and the DMA 420, a control connection between the DMA 420 and the backup device 430 and a data connection between the Equal Logic 414 and the backup device 430.

The NDMP data server 405 is split (i.e., divided) into two components, an installable component on the host (the DS host 412) and the component that is in the external storage array (the DS array 416). The DS host 412 manages the control connection. The DS host 412 is responsible for generating the host specific information; waiting for on incoming connections to the DMA 420, responding to DMA requests, and sending information about the backup stream to the DMA device 420. The DS host 412 also is responsible for identifying what needs to be backed up based on requests from the DMA device 420, generating file specific information that is passed to the DS array 416 that provides the DS array 416 context to allow the DS array 416 to access the blocks that need to be backed up, and is responsible for providing file system, OS and host specific information (like permissions and attributes) that needs to be appended to the backup data stream. This data is passed to the DS array 416 using a private communication path (e.g., that may be implemented using a SCSI connection between the host and the array).

The DS array 416 is resident on a storage array and is the data server side end-point for the NDMP data connection. The DS array 416 reads data directly from the block storage based on context information that is passed to it by the DS host 412 and appends the file information that is receives from the DS host 412 to create the back stream. The DS array 416 also sends the data stream to the backup device 430 over the data connection. The DS array 416 also provides indication and stream information to the DS host 412 such that the DS host 412 can send the DMA file information that is required for file based restores.

Figure 5:
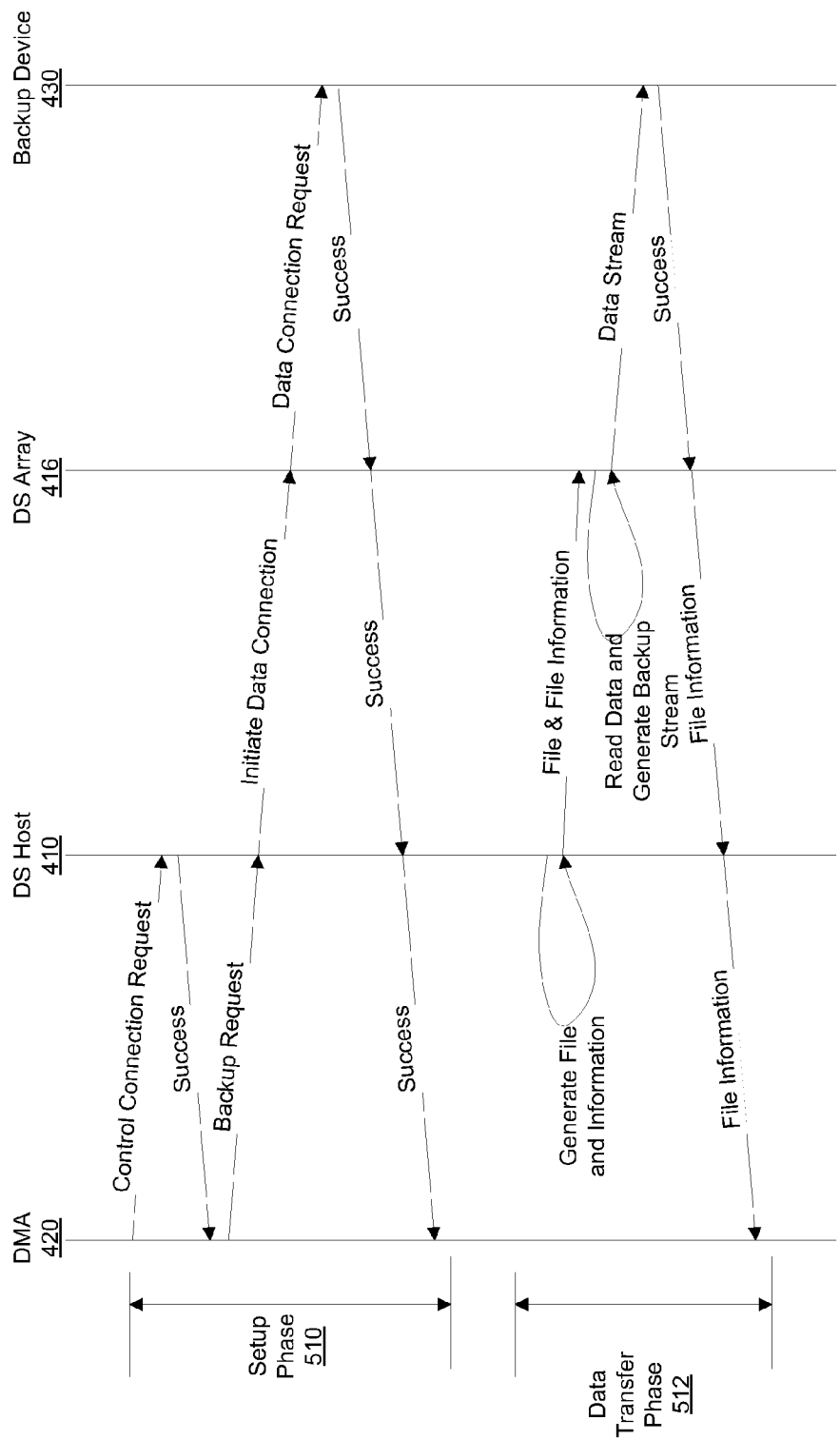
FIG. 5 shows an overview of the operation of the backup system.

Referring to FIG. 5, an overview of the operation of the backup system 400 is shown. This overview is a representation and does not use actual NDMP message names and constructs. With the backup system 400 there can be multiple data transfer phases depending on the amount of data. The backup operation includes a setup phase 510 and a data transfer phase 512.

During the setup phase, a control connection request message is generated from the DMA device 420 to the data server host 410. If successful, a success message is returned from the data server host 410 to the DMA device 420. Note that any messages that are passed between the data server host 410 and the data server array 416 are private messages; other communications conform to the NDMP protocol. Next, a backup request is generated by the DMA device 420 and sent to the data server host 410. The data server host 410 then initiates a data connection with the data server array 416. Next, the data server array generates a data connection request for the backup device 430. The backup device 430 then generates a success message which is provided the data server array 416. The data server array 416 then generates a success message that is provided to the data server host 410. The data server host then generates a success message that is provided to the DMA device 420, thus completing the setup phase 510 of the backup operation.

During the data transfer phase, the data server host 410 generates file and information for backup. The file and file information is provided from the data server host 410 to the data server array 416. The data server array 416 reads the data and generates a backup data stream. The backup data stream is provided by the data server array 416 to the backup device 430. The backup device 430 then generates a success indication that is provided to the data server array 416. The data server array then generates file information that is provided to the data server host 410. The data server host then generates file information that is provided to the DMA 420 without reverting the stream to its original representation. For example, if the data server host 410 indicates that a file needs to be backed up and the data server array 416 finds that the file is compressed, then the backup stream will contain the compressed data without the need to uncompress the data.

If all data is backed up, as indicated by the respective file information, then the data transfer phase completes operation.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, optional tape service in the array can also be supported for direct attach of backup devices.

Also for example, while the described embodiment is with respect to a backup process, it will be appreciated that reversing the process would enable a restore operation to be performed.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for performing a data server backup operation comprising:
   a host;
   a data management application (DMA) coupled to the host;
   a data store array coupled to the host; and,
   a backup device coupled to the data store array and the data management application; and wherein
   the host, data management application, data store array and backup device perform a split backup operation, the split backup operation allowing a component on the host and a component on the storage store array to function together logically to provide a backup agent; and wherein
   the split backup operation comprises a data transfer phase, the data transfer phase comprising
      generating, via the host, file and information for backup;
      providing the file and file information from the host to the data store array, the file and information corresponding to a format determined by the host thereby allowing the split backup operation without converting the file and information;
      reading, via the data store array, the data
      generating, via the data store array a backup data stream; and,
      providing the backup data stream generated by the data store array to the backup device.

2. The system of claim 1 wherein:
   the data server backup operation functions within a network data management protocol (NDMP) data server backup environment.

3. The system of claim 2 wherein:
   the format of the data sent between the host and the backup device is specified by the NDMP specification, but the content is determined by the host.

4. The system of claim 1 wherein:
   the split backup operation comprises a setup phase.

5. The system of claim 4 wherein the setup phase comprises:
   generating a control connection request message from the DMA to the host;
   returning a success message from the host if the control connection request message is successful;
   generating a backup request by the DMA to be sent to the host;
   initiating, via the host, a data connection with the data store array;
   generating, via the data server array a data connection request for the backup device;
   generating, via the backup device, a success message to be provided the data store array;
   generating, via the data store array, a success message to be provided to the host;
   generating, via the host, a success message that is provided to the data management application, thus completing the setup phase of the backup operation.

6. The system of claim 4 wherein the data transfer phase further comprises:
   generating, via the backup device, a success indication that is provided to the data store array;
   generating, via the data store array, file information that is provided to the host;
   generating, via the host, file information that is provided to the data management application.

7. A method for performing a data server backup operation in a backup environment comprising a host, a data management application (DMA) coupled to the host and a data store array coupled to the host, the method comprising:
- coupling a backup device coupled to the data store array and the data management application; and
- performing a split backup operation, the split backup operation allowing a component on the host and a component on the storage store array to function together logically to provide a backup agent and wherein
- the split backup operation comprises a data transfer phase, the data transfer phase comprising
  - generating, via the host, file and information for backup;
  - providing the file and file information from the host to the data store array, the file and information corresponding to a format determined by the host thereby allowing the split backup operation without converting the file and information;
  - reading, via the data store array, the data
  - generating, via the data store array a backup data stream; and,
  - providing the backup data stream generated by the data store array to the backup device.

8. The method of claim 7 wherein:
the data server backup operation functions within a network data management protocol (NDMP) data server backup environment.

9. The method of claim 8 wherein:
the format of the data sent between the host and the backup device is specified by an NDMP specification, but the content is determined by the host.

10. The method of claim 7 wherein:
the split backup operation further comprises a setup phase.

11. The method of claim 10 wherein the setup phase comprises:
- generating a control connection request message from the DMA to the host;
- returning a success message from the host if the control connection request message is successful;
- generating a backup request by the DMA to be sent to the host;
- initiating, via the host, a data connection with the data store array;
- generating, via the data server array a data connection request for the backup device;
- generating, via the backup device, a success message to be provided the data store array;
- generating, via the data store array, a success message to be provided to the host;
- generating, via the host, a success message that is provided to the data management application, thus completing the setup phase of the backup operation.

12. The method of claim 10 wherein the data transfer phase comprises:
- generating, via the backup device, a success indication that is provided to the data store array;
- generating, via the data store array, file information that is provided to the host;
- generating, via the host, file information that is provided to the data management application.

* * * * *